(12) United States Patent
Hu et al.

(10) Patent No.: US 11,787,924 B2
(45) Date of Patent: *Oct. 17, 2023

(54) OLEFIN MULTI-BLOCK COPOLYMER / SILICONE RUBBER / TACKIFIER COMPOSITIONS AND FOAMS

(71) Applicant: Dow Global Technologies LLC, Midland, MI (US)

(72) Inventors: Xiaolian Hu, Shanghai (CN); Haiyang Yu, Shanghai (CN); Kyle G. Kummer, Lake Jackson, TX (US); Wanfu Ma, Shanghai (CN); Hongyu Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 282 days.

This patent is subject to a terminal disclaimer.

(21) Appl. No.: 16/958,726

(22) PCT Filed: Dec. 26, 2018

(86) PCT No.: PCT/US2018/067473
§ 371 (c)(1),
(2) Date: Jun. 28, 2020

(87) PCT Pub. No.: WO2019/133584
PCT Pub. Date: Jul. 4, 2019

(65) Prior Publication Data
US 2020/0332099 A1    Oct. 22, 2020

(30) Foreign Application Priority Data

Dec. 28, 2017 (WO) ................ PCT/CN2017/119255

(51) Int. Cl.
*C08L 23/08* (2006.01)
*C08G 77/20* (2006.01)
*C08K 5/01* (2006.01)
*C08L 53/00* (2006.01)

(52) U.S. Cl.
CPC .......... *C08L 23/0815* (2013.01); *C08G 77/20* (2013.01); *C08K 5/01* (2013.01); *C08L 53/00* (2013.01); *C08G 2410/00* (2013.01); *C08L 2203/14* (2013.01)

(58) Field of Classification Search
None
See application file for complete search history.

(56) References Cited

U.S. PATENT DOCUMENTS

| | | | |
|---|---|---|---|
| 4,210,570 | A | 7/1980 | Trotter et al. |
| 6,013,217 | A | 1/2000 | Hauenstein et al. |
| 6,767,931 | B2 | 7/2004 | Martinez et al. |
| 7,671,106 | B2 | 3/2010 | Markovich et al. |
| 7,750,073 | B2 | 7/2010 | Brahms et al. |
| 8,318,864 | B2 | 11/2012 | Harris et al. |
| 9,914,860 | B2 | 3/2018 | Himmelberger et al. |
| 10,005,934 | B2 | 6/2018 | Himmelberger et al. |
| 2006/0199872 | A1 | 9/2006 | Prieto et al. |
| 2007/0270540 | A1* | 11/2007 | Kanae ............ C08L 23/0815 524/515 |
| 2011/0144240 | A1 | 6/2011 | Harris et al. |
| 2011/0178195 | A1 | 7/2011 | Cheng |
| 2011/0199872 | A1 | 8/2011 | Takazawa et al. |
| 2012/0322905 | A1 | 12/2012 | Kusanose et al. |
| 2015/0166755 | A1 | 6/2015 | Kim |
| 2015/0166779 | A1* | 6/2015 | Diehl .................. C08K 3/013 524/570 |
| 2015/0218331 | A1* | 8/2015 | Low .................. C08L 23/08 525/88 |
| 2016/0160037 | A1 | 6/2016 | Hanna et al. |
| 2018/0127559 | A1 | 5/2018 | Takagi et al. |

FOREIGN PATENT DOCUMENTS

| | | | | |
|---|---|---|---|---|
| CA | 2799922 | A1 * | 12/2011 | ............. C08K 3/04 |
| CN | 101445639 | A * | 6/2009 | ............. C08K 3/013 |
| CN | 103709581 | A | 4/2014 | |
| CN | 104371194 | A | 2/2015 | |
| CN | 105524346 | A | 4/2016 | |
| CN | 105524359 | A | 4/2016 | |
| CN | 105670199 | A | 6/2016 | |
| DE | 102008025982 | A1 | 12/2009 | |
| JP | 3665446 | B2 | 6/2005 | |
| JP | 2007270007 | A * | 10/2007 | ............. C08L 83/00 |
| JP | 4610784 | B2 * | 1/2011 | ............. B32B 27/32 |
| RU | 2224774 | C1 * | 2/2004 | ............. C08K 3/36 |
| WO | WO-2009029476 | A1 * | 3/2009 | ........ C09J 123/0807 |
| WO | 2014036292 | A1 | 3/2014 | |

OTHER PUBLICATIONS

Machine translation of RU 2224774 C1, retrieved Jul. 2022 (Year: 2022).*
Machine translation of JP 2007270007 A, retrieved Jan. 2023 (Year: 2023).*
PCT/CN2017/119255, International Search Report and Written Opinion dated Sep. 27, 2018.
PCT/US2018/067473, International Search Report and Written Opinion dated Mar. 22, 2019.
PCT/US2018/067473, International Preliminary Report on Patentability dated Jun. 30, 2020.

* cited by examiner

*Primary Examiner* — Nicole M. Buie-Hatcher

(57) ABSTRACT

A composition comprising at least the following: A) an olefin multi-block copolymer; B) a silicone rubber; C) a tackifier.

19 Claims, 1 Drawing Sheet

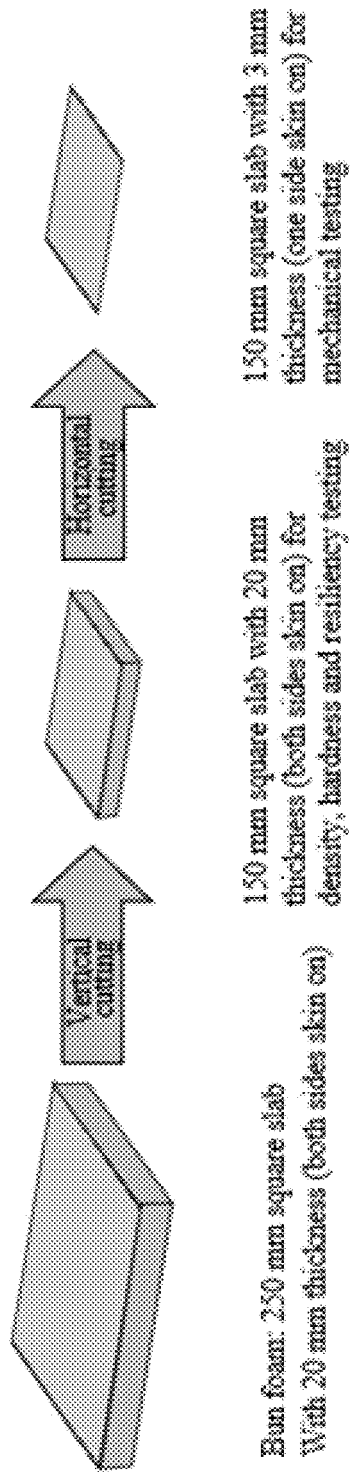

OLEFIN MULTI-BLOCK COPOLYMER / SILICONE RUBBER / TACKIFIER COMPOSITIONS AND FOAMS

CROSS-REFERENCE TO RELATED APPLICATIONS

This application claims priority to, and the benefit of, international patent application no. PCT/CN2017/119255, filed on Dec. 28, 2017.

BACKGROUND

Olefin multi-block copolymers can be used to form lightweight shoe midsoles. For use as a unitsole foam, the polymer composition should have good abrasion resistance and good wet traction performance (coefficient of friction (COF)). Although a polydimethyl-siloxane (PDMS) can be used to improve abrasion resistance, the COF will typically decrease, resulting in poor wet traction. Foamable compositions and/or other elastomeric compositions are described in the following references: US2006/0199872, US2011/0199872, US2011/0144240, U.S. Pat. Nos. 4,210,570, 7,671,106, 7,750,073, 8,318,864, CN104371194A (Abstract), CN105524359A (Abstract), CN105524346A (Abstract), JP3922446B2 (Abstract), KR2008107583A (Abstract), U.S. Pat. No. 6,767,931, US2011/0178195, US2015/0166755, US2016/0067799, KR1075070B1 (abstract), U.S. Pat. Nos. 7,671,106, 6,013,217, US2012/0322905, JP3665446B2 (abstract), CN105670199A (abstract), CN103709581B (abstract). However, there is a need for a new polymer compositions that provides good abrasion resistance and good COF and good mechanical properties, while maintaining good abrasion resistance. These needs have been met by the following invention.

SUMMARY

A composition comprising at least the following:
A) an olefin multi-block copolymer;
B) a silicone rubber;
C) a tackifier.

BRIEF DESCRIPTION OF THE DRAWINGS

FIG. 1 depicts a schematic of different samples cut from a Bun foam.

DETAILED DESCRIPTION

It has been discovered that the "olefin multi-block copolymer/silicone rubber/tackifier" compositions described herein provide excellent traction performance and mechanical properties while maintaining good abrasion resistance. Also, the addition of silicone rubber can help with the processability of the composition when used in injection foaming applications.

As discussed above, the invention provides a composition comprising at least the following:
A) an olefin multi-block copolymer;
B) a silicone rubber;
C) a tackifier.

An inventive composition may comprise a combination of two or more embodiments, as described herein.

Each component of an inventive composition may comprise a combination of two or more embodiments as described herein.

In one embodiment, the composition of claim 1, wherein the olefin multi-block copolymer of component A is present in an amount ≥50 wt %, or ≥55 wt %, or ≥60 wt %, or ≥65 wt %, or ≥70 wt %, or ≥75 wt %, or ≥80 wt %, or ≥85 wt %, based on the weight of the composition. In a further embodiment, the olefin multi-block copolymer is an ethylene/α-olefin multi-block copolymer. In a further embodiment, the α-olefin is a C3-C8 α-olefin, and further a C4-C8 α-olefin.

In one embodiment, the composition further comprises an ethylene-based polymer. In a further embodiment, the ethylene-based polymer is a LDPE.

In one embodiment, the silicone rubber has a weight average molecular weight (Mw)≥100,000 g/mole, or ≥150,000 g/mole, or ≥200,000 g/mole, or ≥250,000 g/mole, or ≥300,000 g/mole, or ≥350,000 g/mole, or ≥400,000 g/mole.

In one embodiment, the silicone rubber comprises a structure (a) shown below:

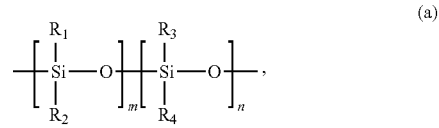

(a)

where m is from 1 to 20000, and n is from 1 to 20000; R1, R2, R3 and R4 each, individually, is selected from methyl, phenyl, vinyl, or trifluoropropyl, and where least one of R1, R2, R3 and R4 is vinyl.

In one embodiment, the silicone rubber comprises a structure (b) shown below:

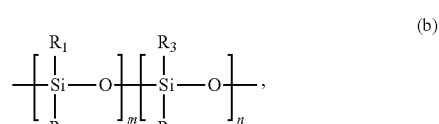

(b)

where m is from 1 to 20000, and n is from 1 to 20000;
R1, R2, R3, R4 each, independently, an alkyl, and R1, R2, R3, R4 may be the same alkyl.

In one embodiment, the silicone rubber comprises a structure selected from i) and/or a structure selected from ii) below:

i) —O—[Si(R)(CH=CH$_2$)]—[Si(R')(R")]—O—, wherein R, R' and R" are each, independently, an alkyl group, and further a C1-C6 alkyl group, and wherein R, R' and R" may all be the same alkyl group;

ii) H$_2$C=CH—[Si(R$^{IV}$)(R$^V$)]—O—, wherein R$^{IV}$ and R$^V$ are each, independently, an alkyl group, and further a C1-C6 alkyl group, and wherein R$^{IV}$ and R$^V$ may be the same alkyl group. Here, structure i) represents an internal group of a silicone rubber polymer molecule, which internal group is bonded to additional portions of the polymer molecule at each respective oxygen end group. Structure ii) represents an end group of a silicone rubber polymer molecule, which end group is bonded to an additional portion of the polymer molecule at the oxygen end group.

In one embodiment, wherein the silicone rubber that comprises pendant vinyl groups and terminal vinyl groups. In one embodiment, the silicone rubber comprises a structure selected from iii):

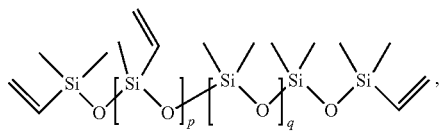

iii)

where p is from 1 to 20, and q is from 2000 to 20000. Here, structure iii) shows an example of pendant vinyl groups, and terminal vinyl groups. In structure iii) above, the pendant vinyl group can be randomly distributed throughout the polymer chain.

In one embodiment, the silicone rubber has a viscosity ≥$10^6$ cSt at 25° C.

In one embodiment, the silicone rubber has a total vinyl ($CH_2$=CH) content ≥0.10 mol %, based on the total PDMS unit of the silicone rubber, and as determined by 1H NMR.

In one embodiment, the silicone rubber is not a liquid at room temperature (23° C.).

In one embodiment, the silicone rubber is a solid at room temperature (23° C.).

The silicone rubber may comprise a combination of two or more embodiments as described herein.

In one embodiment, the tackifier is a hydrocarbon. As used herein, a hydrocarbon is an organic compound or polymer containing only hydrogen and carbon atoms. In a further embodiment, the tackifier is a hydrogenated hydrocarbon, a non-hydrogenated hydrocarbon or a combination thereof.

In one embodiment, the tackifier is selected from a C5 tackifier, a C9 tackifier or a dicyclopentadiene (DCPD) based hydrocarbon resin The tackifier may comprise a combination of two or more embodiments as described herein.

In one embodiment, the olefin multi-block copolymer is an ethylene/α-olefin multi-block copolymer. In a further embodiment, the α-olefin is a C3-C8 α-olefin, and further a C4-C8 α-olefin.

In one embodiment, wherein the olefin multi-block copolymer has a density from 0.866 g/cc to 0.887 g/cc, or from 0.868 g/cc to 0.885 g/cc, or from 0.870 g/cc to 0.880 g/cc, or from 0.872 g/cc to 0.880 g/cc, or from 0.874 g/cc to 0.880 g/cc (1 cc=1 $cm^3$).

In one embodiment, the olefin multi-block copolymer has a melt index (I2) from 0.5 to 5.0 g/10 min, or from 1.0 to 4.0 g/10 min, or from 1.0 to 3.0 g/10 min, or from 1.0 to 2.0 g/10 min (190° C. and 2.16 kg).

In one embodiment, the olefin multi-block copolymer has a melt temperature (Tm) from 100° C. to 135° C., further from 110° C. to 130° C., further from 115° C. to 125° C.

The olefin multi-block copolymer may comprise a combination of two or more embodiments as described herein.

In one embodiment, the composition comprises from 1 to 20 phr, or from 2 to 18 phr, or from 3 to 16 phr of component B, based on 100 parts of component A.

In one embodiment, the composition comprises ≥60 wt %, or ≥65 wt %, or ≥70 wt %, or ≥75 wt %, or ≥80 wt %, ≥85 wt %, or ≥90 wt %, or ≥95 wt %, or ≥98 wt %, or ≥99 wt % of component A, component B and component C, based on weight of the composition.

In one embodiment, the amount of component A, present in the composition, is greater than the amount of component B, present in the composition.

In one embodiment, the weight ratio of component A to component B is from 2.0 to 40, or from 3.0 to 45, or from 4.0 to 40, or from 5.0 to 35.

In one embodiment, the weight ratio of component A to component B is from 5.0 to 30, or from 5.0 to 25, or from 5.0 to 20.

In one embodiment, the weight ratio of component A to component C is from 30 to 60, or from 35 to 55, or from 40 to 50.

In one embodiment, the weight ratio of component B to component C is from 1.0 to 10, or from 1.0 to 8.0, or from 1.5 to 8.0.

In one embodiment, the composition further comprises a filler. For example, an inorganic filler (e.g. calcium carbonate, talc, silica).

In one embodiment, the composition further comprises a bromobutyl rubber.

In one embodiment, the composition further comprises an ethylene-based polymer. In a further embodiment, the ethylene-based polymer is an LDPE.

In one embodiment, the composition further comprises a crosslinking agent (for example, a peroxide (i.e., dicumyl peroxide) or a triallyl isocyanurate).

In one embodiment, the composition further comprises a blowing agent, such as modified azodicarbonamide, benzenesulfonyl hydrazide, dinitrosopentamethylene-tetramine, sodium bicarbonate, or ammonium carbonate.

In one embodiment, the composition comprises one or more activators of blowing agent (e.g. zinc oxide, zinc stearate).

In one embodiment, the composition comprises from 70 to 98 wt % of component A, from 2 to 30 wt % of component B, from 1 to 10 wt % of component C, from 0.1 to 10 wt % of a crosslinking agent, from 0.1 to 10 wt % of a blowing agent, from 0 to 5 wt % of one or more activators, and from 0 to 5 wt % of a filler.

In one embodiment, the composition has an abrasion DIN value ≤215 $mm^3$, or ≤210 $mm^3$, or ≤205 $mm^3$. In one embodiment, the composition has an abrasion DIN value from 145 $mm^3$ to 220 $mm^3$, or from 150 $mm^3$ to 215 $mm^3$, or 155 $mm^3$ to 210 $mm^3$.

In one embodiment, the composition has a wet COF value ≥0.50, or ≥0.51, or ≥0.52. In one embodiment, the composition has a wet COF value ≥0.53, or ≥0.54, or ≥0.55, or ≥0.56, or ≥0.57, or ≥0.58, or ≥0.59 $mm^3$. In one embodiment, the composition has a COF value from 0.54 to 0.63, or from 0.56 to 0.62, or from 0.58 to 0.61.

In one embodiment, the composition has a Resilience ≥65%, or ≥66%. In one embodiment, the composition has a Resilience from 65% to 69%, or from 65% to 68%.

In one embodiment, the composition has a Tensile Strength ≥2.50 MPa, or ≥2.60 MPa, or ≥2.70 MPa. In one embodiment, the composition has a Tensile Strength from 2.50 MPa to 3.20 MPa, or from 2.60 MPa to 3.20 MPa, or from 2.70 MPa to 3.20 MPa.

In one embodiment, the composition has an elongation from 400% to 500%.

In one embodiment, the composition has a Tear value from 14.0 N/mm to 15.0 N/mm. In one embodiment, the composition has a Split Tear value from 3.0 N/mm to 5.0 N/mm, or from 3.5 N/mm to 5.0 N/mm.

In one embodiment, the composition has a Resilience ≥60%, a DIN ≤220 $mm^3$ and a wet COF ≥0.55. In one embodiment, the composition has a Resilience ≥65%, a DIN ≤210 $mm^3$ and a wet COF ≥0.59.

In one embodiment, the composition comprises ≤1.00 wt %, or ≤0.50 wt %, or ≤0.20 wt %, or ≤0.10 wt %, or ≤0.05 wt % of a styrenic block copolymer or terpolymer (for example, an SES, SBS, SEP, etc.), based on the weight of the composition. In one embodiment, the composition does not comprise a styrenic block copolymer or terpolymer (for example, an SES, SBS, SEP, etc.).

In one embodiment, the composition comprises ≤1.00 wt %, or ≤0.50 wt %, or ≤0.20 wt %, or ≤0.10 wt %, or ≤0.05 wt % of a polystyrene, based on the weight of the composition. In one embodiment, the composition does not comprise a polystyrene.

In one embodiment, the composition comprises ≤50 wt %, or ≤40 wt %, or ≤30 wt %, or ≤20 wt %, or ≤10 wt % of an EVA, based on the weight of the composition.

In one embodiment, the composition comprises ≤1.00 wt %, or ≤0.50 wt %, or ≤0.20 wt %, or ≤0.10 wt %, or ≤0.05 wt % of an EVA, based on the weight of the composition. In one embodiment, the composition does not comprise an EVA.

In one embodiment, the composition comprises ≤1.00 wt %, or ≤0.50 wt %, or ≤0.20 wt %, or ≤0.10 wt %, or ≤0.05 wt % of a polyamide, based on the weight of the composition. In one embodiment, the composition does not comprise a polyamide.

An inventive composition may comprise a combination of two or more embodiments as described herein.

Also is provided an article comprising at least one component formed from the composition of one or more compositions described herein. In a further embodiment, the article is a foam, and further a unitsole foam. In one embodiment, the foam has a density from 0.10 to 0.80 g/cc, or from 0.15 to 0.60 g/cc, or from 0.20 to 0.40 g/cc.

An article may comprise a combination of two or more embodiments as described herein.

In addition to footwear applications, the present compositions may be useful for tire applications (such as normal bicycle tires, electric bicycle tires, scooter tires, etc.), mat applications (such as yoga mats, traction mats, flooring mats, etc.), and foamed conveyor belt applications.

Olefin Multi-Block Copolymer

The present composition includes an olefin multi-block copolymer or olefin block copolymer. An "olefin block copolymer" (or OBC), as used herein, is a multi-block or segmented copolymer and includes two or more chemically distinct regions or segments (referred to as "blocks") joined in a linear manner, that is, a polymer comprising chemically differentiated units, which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block copolymer is characterized by unique distributions of polydispersity index (PDI or MW/M), block length distribution, and/or block number distribution due to the unique process making of the copolymers. More specifically, when produced in a continuous process, embodiments of the OBC may possess a PDI ranging from 1.7 to 8; or from 1.7 to 3.5; or from 1.7 to 2.5; or from 1.8 to 2.5; or from 1.8 to 2.1. When produced in a batch or semi-batch process, embodiments of the OBC may possess a PDI ranging from 1.0 to 2.9; or from 1.3 to 2.5; or from 1.4 to 2.0; or from 1.4 to 1.8.

In an embodiment, the OBC is an ethylene/α-olefin multi-block copolymer. The ethylene/α-olefin multi-block copolymer comprises a majority mole fraction of units derived from ethylene, the ethylene comprising at least 50 mol %, or at least 60 mol %, or at least 70 mol %, or at least 80 mol %, with the remainder of the multi-block copolymer comprising the comonomer. The ethylene/α-olefin multi-block copolymer further includes ethylene and the co-polymerizable α-olefin comonomer in polymerized form, characterized by multiple (i.e., two or more) blocks or segments of two or more polymerized monomer units differing in chemical or physical properties (block interpolymer), and is a multi-block copolymer. In some embodiments, the multi-block copolymer may be represented by the following formula:

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. The A's and B's are linked in a linear fashion, not in a branched or a star fashion. "Hard" segments refer to blocks of polymerized units, in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all, or substantially all, ethylene.

The "soft" segments," on the other hand, refer to blocks of polymerized units, in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

Because the respective distinguishable segments or blocks formed from two or more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an embodiment, the quantity of extractable polymer using either a dialkyl ether or an alkane solvent is less than 10, or less than 7, or less than 5, or less than 2, percent of the total polymer weight.

In addition, the OBC disclosed herein possesses a PDI, fitting a Schulz-Flory distribu-tion rather than a Poisson distribution. The present OBC is produced by the polymerization process described in U.S. Pat. Nos. 7,858,706 and 7,608,668, which results in a product having both a polydisperse block distribution, as well as a polydisperse distribution of block sizes. This results in the formation of OBC product having distinguishable physical properties. The theoretical benefits of a polydisperse block distribution have been previously modeled and discussed in Potemkin, Physical Review E (1998) 57 (6), pp. 6902-6912, and Dobrynin, *J. Chem. Phys.* (1997) 107 (21), pp 9234-9238.

In an embodiment, the olefin block copolymer is an ethylene/α-olefin multi-block copolymer. In a further embodiment, the ethylene/α-olefin multi-block copolymer has a density from 0.86 to 0.89 g/cc, further from 0.87 to 0.88 g/cc (1 cc=1 cm$^3$).

In an embodiment, the ethylene/α-olefin multi-block copolymer is defined as having
(A) Mw/Mn from 1.7 to 3.5, at least one melting point, Tm, in degrees Celsius, and a density, d, in grams/cubic centimeter, where in the numerical values of Tm and d correspond to the relationship:

Tm>-2002.9+4538.5($d$)-2422.2($d$)$^2$.

In an embodiment, the ethylene/α-olefin multi-block copolymer is defined as having (A) Mw/Mn from 1.7 to 3.5, at least one melting point, Tm, in degrees Celsius, and a density, d, in grams/cubic centimeter, where in the numerical values of Tm and d correspond to the relationship:

Tm>-2002.9+4538.5($d$)-2422.2($d$)$^2$, wherein d is from 0.866 g/cc, or 0.87 g/cc to 0.89 g/cc, or 0.91 g/cc, or 0.93 g/cc, and Tm is from 113° C., or 115° C., or 117° C., or 118° C. to 120° C., or 125° C., or 130° C.

In an embodiment, the ethylene/α-olefin multi-block copolymer is defined as having (B) Mw/Mn from 1.7 to 3.5, and is characterized by a heat of fusion, ΔH in J/g, and a delta quantity, ΔT, in degrees Celsius, defined as the temperature difference between the tallest DSC peak and the tallest Crystallization Analysis Fractionation ("CRYSTAF") peak, wherein the numerical values of ΔT and ΔH have the following relationships:

Δ$T$>-0.1299 (Δ$H$)+62.81 for Δ$H$ greater than zero and up to 130 J/g,

Δ$T$≥48° C. for Δ$H$ greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.

In an embodiment, the ethylene/α-olefin multi-block copolymer is defined as having (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

Re>1481-1629($d$).

In an embodiment, the ethylene/α-olefin multi-block copolymer is defined as having (D) a molecular weight fraction which elutes between 40° C. and 130° C., when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and a molar comonomer content (based on the whole polymer) within 10 percent of that of the ethylene/α-olefin interpolymer.

In an embodiment, the ethylene/α-olefin multi-block copolymer is defined as having (E) a storage modulus at 25° C., G'(25° C.), and a storage modulus at 100° C., G'(100° C.), wherein the ratio of G'(25° C.) to G'(100° C.) is in the range of about 1:1 to about 9:1.

In an embodiment, the ethylene/α-olefin multi-block copolymer is defined as having (F) a molecular fraction which elutes between 40° C. and 130° C., when fractionated using TREF, characterized in that the fraction has a block index of at least 0.5, and up to about 1, and a molecular weight distribution, Mw/Mn, greater than about 1.3. In a further embodiment, the ethylene/α-olefin multi-block copolymer has a molecular weight distribution, Mw/Mn, less than, or equal to, about 3.5.

In an embodiment, the ethylene/α-olefin multi-block copolymer is defined as having (G) average block index greater than zero, and up to about 1.0, and a molecular weight distribution, Mw/Mn, greater than about 1.3.

The ethylene/α-olefin multi-block copolymer may have any combination of properties (A)-(G) set forth above.

Nonlimiting examples of suitable comonomer include straight-chain/branched α-olefin of 3 to 30 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the comonomer in the ethylene/α-olefin multi-block copolymer is selected from propylene, butene, hexene, or octene.

In an embodiment, the ethylene/α-olefin multi-block copolymer excludes styrene.

In an embodiment, the ethylene/α-olefin multi-block copolymer is an ethylene/octene multi-block copolymer. In a further embodiment, the ethylene/octene multi-block copolymer has a density from 0.86 to 0.89 g/cc (1 cc=1 cm$^3$).

In an embodiment, the soft segment of the ethylene/octene multi-block copolymer includes from 5 mol %, or 7 mol %, or 9 mol %, or 11 mol %, or 13 mol %, or 15 mol % to 18 mol % or 20 mol % units derived from octene. The ethylene/octene multi-block copolymer has a density from 0.866 g/cc to 0.887 g/cc. The ethylene/octene multi-block copolymer has a melt index (MI) from 0.5 g/10 min, or 5.0 g/10 min, or 10 g/10 min, or 15 g/10 min, to 20 g/10 min, or 25 g/10 min, or 30 g/10 min.

In an embodiment, the OBC is an ethylene/octene multi-block copolymer with one, some, or all of the following properties: a density from 0.866 g/cc to 0.880 g/cc, a melt index from 0.5 g/10 min to 10 g/10 min, and a melt temperature from 100° C. to 130° C., or from 110° C. to 125° C.

Olefin multi-block copolymers are available from The Dow Chemical Company under the name INFUSE Olefin Block Copolymers.

An olefin block copolymer may comprise a combination of two or more embodiments as described herein. An ethylene/α-olefin multi-block copolymer may comprise a combination of two or more embodiments as described herein.

Additives

The present composition may include one or more additives. Additives include, but are not limited to, antioxidants, ultraviolet absorbers, antistatic agents, pigments, viscosity modifiers, anti-block agents, release agents, fillers, coefficient of friction (COF) modifiers, induction heating particles, odor modifiers/absorbents, and any combination thereof.

In one embodiment, the composition comprises the following, based on the weight of the composition: from 70 to 98 wt % of the olefin multi-block copolymer, from 5 to 30 wt % of the silicone rubber, from 1 to 10 wt % of a bromobutyl rubber, from 0.1 to 10 wt % of a crosslinking agent, from 0.1 to 10 wt % of a blowing agent, from 0 to 5 wt % of one or more activators, and from 0 to 10 wt % of an inorganic filler.

Summary of Some Embodiments

1) A composition comprising at least the following:
   A) an olefin multi-block copolymer;
   B) a silicone rubber;
   C) a tackifier.
2) The composition of 1, wherein the olefin multi-block copolymer of component A is present in an amount ≥50 wt %, or ≥55 wt %, or ≥60 wt %, or ≥65 wt %, or ≥70 wt %, or ≥75 wt %, or ≥80 wt %, or ≥85 wt %, based on the weight of the composition. In a further embodiment, the olefin multi-block copolymer is an ethylene/α-olefin multi-block copolymer. In a further embodiment, the α-olefin is a C3-C8 α-olefin, and further a C4-C8 α-olefin.
3) The composition of 1 or 2, wherein the composition further comprises an ethylene-based polymer. In a further embodiment, the ethylene-based polymer is a LDPE.
4) The composition of any one of 1-3, wherein the silicone rubber has a weight average molecular weight (Mw) ≥100,000 g/mole, or ≥150,000 g/mole, or ≥200,000 g/mole, or ≥250,000 g/mole, or ≥300,000 g/mole, or ≥350,000 g/mole, or ≥400,000 g/mole.
5) The composition of any one of 1-4, wherein the silicone rubber comprises a structure (a) shown below:

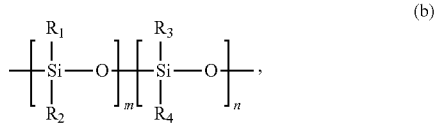
(b)

where m is from 1 to 20000, and n is from 1 to 20000; R1, R2, R3 and R4 each, individually, is selected from methyl, phenyl, vinyl, or trifluoropropyl, and where least one of R1, R2, R3 and R4 is vinyl.
6) The composition of any one of 1-5, wherein the silicone rubber comprises a structure (b) shown below:

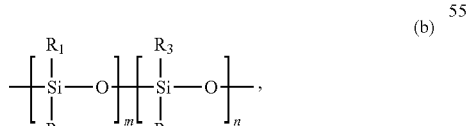
(b)

where m is from 1 to 20000, and n is from 1 to 20000; R1, R2, R3, R4 each, independently, an alkyl, and R1, R2, R3, R4 may be the same alkyl.
7) The composition of any one of 1-6, wherein the silicone rubber comprises a structure selected from i) and/or a structure selected from ii) below:

i) —O—[Si(R)(CH=CH$_2$)]—[Si(R')(R")]—O—, wherein R, R' and R" are each, independently, an alkyl group, and further a C1-C6 alkyl group, and wherein R, R' and R" may all be the same alkyl group;
ii) H$_2$C=CH—[Si(R$^{IV}$)(R$^V$)]—O—, wherein R$^{IV}$ and R$^V$ are each, independently, an alkyl group, and further a C1-C6 alkyl group, and wherein R$^{IV}$ and R$^V$ may be the same alkyl group. Here, structure i) represents an internal group of a silicone rubber polymer molecule, which internal group is bonded to additional portions of the polymer molecule at each respective oxygen end group. Structure ii) represents an end group of a silicone rubber polymer molecule, which end group is bonded to an additional portion of the polymer molecule at the oxygen end group.
8) The composition of any one of 1-7, wherein the silicone rubber that comprises pendant vinyl groups and terminal vinyl groups. In one embodiment, the silicone rubber comprises a structure selected from iii):

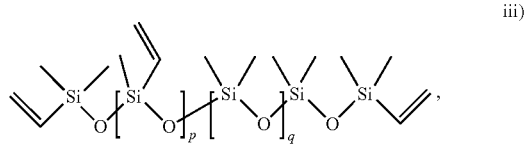
iii)

where p is from 1 to 20, and q is from 2000 to 20000. Here, structure iii) shows an example of pendant vinyl groups, and terminal vinyl groups. In structure iii) above, the pendant vinyl group can be randomly distributed throughout the polymer chain.
9) The composition of any one of 1-8, wherein the silicone rubber has a viscosity ≥106 cSt at 25° C.
10) The composition of any one of 1-9, wherein the silicone rubber has a total vinyl (CH$_2$=CH) content ≥0.10 mol %, based on the total PDMS unit of the silicone rubber, and as determined by 1H NMR.
11) The composition of any one of 1-10, wherein the silicone rubber is not a liquid at room temperature (23° C.).
12) The composition of any one of 1-11, wherein the silicone rubber is a solid at room temperature (23° C.).
13) The composition of any one of 1-12, wherein the tackifier is a hydrocarbon. As used herein, a hydrocarbon is an organic compound or polymer containing only hydrogen and carbon atoms. In a further embodiment, the tackifier is a hydrogenated hydrocarbon, a non-hydrogenated hydrocarbon or a combination thereof.
14) The composition of any one of 1-13, wherein the tackifier is selected from a C5 tackifier, a C9 tackifier or a dicyclopentadiene (DCPD) based hydrocarbon resin.
15) The composition of any one of 1-14, wherein the olefin multi-block copolymer is an ethylene/α-olefin multi-block copolymer. In a further embodiment, the α-olefin is a C3-C8 α-olefin, and further a C4-C8 α-olefin.
16) The composition of any one of 1-15, wherein the olefin multi-block copolymer has a density from 0.866 g/cc to 0.887 g/cc, or from 0.868 g/cc to 0.885 g/cc, or from 0.870 g/cc to 0.880 g/cc, or from 0.872 g/cc to 0.880 g/cc, or from 0.874 g/cc to 0.880 g/cc (1 cc=1 cm$^3$).

17) The composition of any one of 1-16, wherein the olefin multi-block copolymer has a melt index (I2) from 0.5 to 5.0 g/10 min, or from 1.0 to 4.0 g/10 min, or from 1.0 to 3.0 g/10 min, or from 1.0 to 2.0 g/10 min (190° C. and 2.16 kg).

18) The composition of any one of 1-17, wherein the olefin multi-block copolymer has a melt temperature (Tm) from 100° C. to 135° C., further from 110° C. to 130° C., further from 115° C. to 125° C.

19) The composition of any one of 1-18, wherein the composition comprises from 1 to 20 phr, or from 2 to 18 phr, or from 3 to 16 phr of component B, based on 100 parts of component A.

20) The composition of any one of 1-19, wherein the composition comprises ≥60 wt %, or ≥65 wt %, or ≥70 wt %, or ≥75 wt %, or ≥80 wt %, ≥85 wt %, or ≥90 wt %, or ≥95 wt %, or ≥98 wt %, or ≥99 wt % of component A, component B and component C, based on weight of the composition.

21) The composition of any one of 1-20, wherein the amount of component A, present in the composition, is greater than the amount of component B, present in the composition.

22) The composition of any one of 1-21, wherein the weight ratio of component A to component B is from 2.0 to 40, or from 3.0 to 45, or from 4.0 to 40, or from 5.0 to 35.

23) The composition of any one of 1-22, wherein the weight ratio of component A to component B is from 5.0 to 30, or from 5.0 to 25, or from 5.0 to 20.

24) The composition of any one of 1-23, wherein the weight ratio of component A to component C is from 30 to 60, or from 35 to 55, or from 40 to 50.

25) The composition of any one of 1-24, wherein the weight ratio of component B to component C is from 1.0 to 10, or from 1.0 to 8.0, or from 1.5 to 8.0

26) The composition of any one of 1-25, wherein the composition further comprises a filler. For example, an inorganic filler (e.g. calcium carbonate, talc, silica).

27) The composition of any one of 1-26, wherein the composition further comprises a bromobutyl rubber.

28) The composition of any one of 1-27, wherein the composition further comprises an ethylene-based polymer. In a further embodiment, the ethylene-based polymer is an LDPE.

29) The composition of any one of 1-28, wherein the composition further comprises a crosslinking agent (for example, a peroxide (i.e., dicumyl peroxide) or a triallyl isocyanurate).

30) The composition of any one of 1-29, wherein the composition further comprises a blowing agent, such as modified azodicarbonamide, benzenesulfonyl hydrazide, dinitrosopentamethylene-tetramine, sodium bicarbonate, or ammonium carbonate.

31) The composition of any one of 1-30, wherein the composition comprises one or more activators of blowing agent (e.g. zinc oxide, zinc stearate).

32) The composition of any one of 1-31, wherein the composition comprises from 70 to 98 wt % of component A, from 2 to 30 wt % of component B, from 1 to 10 wt % of component C, from 0.1 to 10 wt % of a crosslinking agent, from 0.1 to 10 wt % of a blowing agent, from 0 to 5 wt % of one or more activators, and from 0 to 5 wt % of a filler.

33) The composition of any one of 1-32, wherein the composition has an abrasion DIN value ≤215 mm$^3$, or ≤210 mm$^3$, or ≤205 mm$^3$.

34) The composition of any one of 1-33, wherein the composition has an abrasion DIN value from 145 mm$^3$ to 220 mm$^3$, or from 150 mm$^3$ to 215 mm$^3$, or 155 mm$^3$ to 210 mm$^3$.

35) The composition of any one of 1-34, wherein the composition has a wet COF value ≥0.50, or ≥0.51, or ≥0.52.

36) The composition of any one of 1-35, wherein the composition has a wet COF value ≥0.53, or ≥0.54, or ≥0.55, or ≥0.56, or ≥0.57, or ≥0.58, or ≥0.59 mm$^3$.

37) The composition of any one of 1-36, wherein the composition has a COF value from 0.54 to 0.63, or from 0.56 to 0.62, or from 0.58 to 0.61.

38) The composition of any one of 1-37, wherein the composition has a Resilience ≥65%, or ≥66%.

39) The composition of any one of 1-38, wherein the composition has a Resilience from 65% to 69%, or from 65% to 68%.

40) The composition of any one of 1-39, wherein the composition has a Tensile Strength ≥2.50 MPa, or ≥2.60 MPa, or ≥2.70 MPa.

41) The composition of any one of 1-40, wherein the composition has a Tensile Strength from 2.50 MPa to 3.20 MPa, or from 2.60 MPa to 3.20 MPa, or from 2.70 MPa to 3.20 MPa.

42) The composition of any one of 1-41, wherein the composition has an elongation from 400% to 500%.

43) The composition of any one of 1-42, wherein the composition has a Tear value from 14.0 N/mm to 15.0 N/mm.

44) The composition of any one of 1-43, wherein the composition has a Split Tear value from 3.0 N/mm to 5.0 N/mm, or from 3.5 N/mm to 5.0 N/mm.

45) The composition of any one of 1-44, wherein the composition has a Resilience ≥60%, a DIN ≤220 mm$^3$ and a wet COF ≥0.55.

46) The composition of any one of 1-45, wherein the composition has a Resilience ≥65%, a DIN ≤210 mm$^3$ and a wet COF ≥0.59.

47) The composition of any one of 1-46, wherein the composition comprises ≤1.00 wt %, or ≤0.50 wt %, or ≤0.20 wt %, or ≤0.10 wt %, or ≤0.05 wt % of a styrenic block copolymer or terpolymer (for example, an SES, SBS, SEP, etc.), based on the weight of the composition.

48) The composition of any one of 1-47, wherein the composition does not comprise a styrenic block copolymer or terpolymer (for example, an SES, SBS, SEP, etc.).

49) The composition of any one of 1-48, wherein the composition comprises ≤1.00 wt %, or ≤0.50 wt %, or ≤0.20 wt %, or ≤0.10 wt %, or ≤0.05 wt % of a polystyrene, based on the weight of the composition.

50) The composition of any one of 1-49, wherein the composition does not comprise a polystyrene.

51) The composition of any one of 1-50, wherein the composition comprises ≤50 wt %, or ≤40 wt %, or ≤30 wt %, or ≤20 wt %, or ≤10 wt % of an EVA, based on the weight of the composition.

52) The composition of any one of 1-51, wherein the composition comprises ≤1.00 wt %, or ≤0.50 wt %, or ≤0.20 wt %, or ≤0.10 wt %, or ≤0.05 wt % of an EVA, based on the weight of the composition.

53) The composition of any one of 1-52, wherein the composition does not comprise an EVA.

54) The composition of any one of 1-53, wherein the composition comprises ≤1.00 wt %, or ≤0.50 wt %, or ≤0.20 wt %, or ≤0.10 wt %, or ≤0.05 wt % of a polyamide, based on the weight of the composition.
55) The composition of any one of 1-54, wherein the composition does not comprise a polyamide.
56) An article comprising at least one component formed from the composition of anyone of 1-55.
57) The article of 56, wherein the article is a foam, and further a unitsole foam.
58) The article of 57, wherein the foam has a density from 0.10 to 0.80 g/cc, or from 0.15 to 0.60 g/cc, or from 0.20 to 0.40 g/cc.

Definitions

Unless stated to the contrary, implicit from the context, or customary in the art, all parts and percents are based on weight, and all test methods are current as of the filing date of this disclosure.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to polymers prepared by the polymerization of at least two different types of monomers. The generic term interpolymer thus includes copolymers (typically employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomer.

The term, "ethylene-based polymer," as used herein, refers to a polymer that comprises a majority weight percent polymerized ethylene monomer (based on the total weight of the polymer), and optionally may comprise at least one polymerized comonomer.

The term, "ethylene/α-olefin interpolymer," as used herein, refers to an interpolymer that comprises, in polymerized form, a majority amount of ethylene monomer (based on the weight of the interpolymer), and at least one α-olefin. This term does not include the olefin block copolymers.

The term, "ethylene/α-olefin copolymer," as used herein, refers to a copolymer that comprises, in polymerized form, a majority amount of ethylene monomer (based on the weight of the copolymer), and an α-olefin, as the only two monomer types. This term does not include the olefin block copolymers.

The term "propylene-based polymer," as used herein, refers to a polymer that comprises, in polymerized form, a majority amount of propylene monomer (based on the total weight of the polymer) and optionally may comprise at least one polymerized comonomer.

Test Methods

GPC—Silicone Rubber

The chromatographic equipment consisted of a Waters 2695 Separations Module equipped with a vacuum degasser, and a Waters 2414 refractive index detector. The separation was made with three STYRAGEL HR columns (300 mm×7.8 mm) (molecular weight separation range of 100 to 4,000,000), preceded by a STYRAGEL guard column (30 mm×4.6 mm). The analyses were performed using certified grade toluene, flowing at 1.0 m/min as the eluent, and the columns and detector were both heated to 45° C. The sample (0.5% wt/v) was prepared by weighing approx. 0.025 g of neat sample into a 12-mL glass vial, and diluting with approx. 5 ml toluene. The sample solution was transferred to a glass autosampler vial, after filtered through 0.45 μm PTFE filter. An injection volume of 100 uL was used, and data was collected for 38 minutes. Data collection and analyses were performed using Waters Empower GPC software. Molecular weight averages were determined relative to a calibration curve (3rd order) created using polystyrene standards covering the molecular weight range of 370-1,270,000 g/mole.

$^1$H NMR—Identification of Total Vinyl Level of Silicone Products

For Silicone Rubber (for Example, RBB-2008-50)

Sample (0.05 g) was dissolved in about 2.75 g CDCl3 at 50° C. in a 10 mm NMR tube. $^1$H NMR was performed on a Bruker AVANCE 400 MHz spectrometer equipped with a Bruker Dual DUL high-temperature CryoProbe and a sample temperature of 50° C. Two experiments were run to obtain spectra, a control spectrum to quantitate the total polymer protons, and a double presaturation experiment, which suppresses the intense polymer backbone peaks and enables high sensitivity spectra for quantitation of the unsaturation. The control was run with ZG pulse, 8 scans, 1.64 s, relaxation delay ($D_1$) 30 s. The double presaturation experiment was run with a modified pulse sequence, 100 scans, DS 4, AQ 1.64 s, presaturation time ($D_1$) Is, relaxation delay ($D_{13}$) 30 s.

For Silicone Rubber Blend (for Example, MB50-002)

The test sample was prepared by adding 0.05 g of sample to 2.75 g of 50/50 by weight ortho-dichlorobenzene-d4/Perchloroethylene with 0.001 M Cr(AcAc)3 in a 10 mm NMR tube. $^1$H NMR was performed on a Bruker AVANCE 400 MHz spectrometer equipped with a Bruker Dual DUL high-temperature CryoProbe and a sample temperature of 120° C. Two experiments were run to obtain spectra, a control spectrum to quantitate the total polymer protons, and a double presaturation experiment, which suppresses the intense polymer backbone peaks and enables high sensitivity spectra for quantitation of the end-groups. The control was run with ZG pulse, 16 scans, 1.64 s, relaxation delay ($D_1$) 14 s. The double presaturation experiment was run with a modified pulse sequence, 200 scans, DS 4, AQ 1.64 s, presaturation time ($D_1$) Is, relaxation delay ($D_{13}$) 13 s.

$^{29}$Si NMR—Confirm the Existence of Pendant Vinyl

Approximately 0.85 g sample was dissolved in about 1.5 g CDCl$_3$, containing 0.025 M Cr(AcAc)$_3$ as a relaxation agent, at 50° C., in a 10 mm NMR tube. $^{29}$Si NMR was performed on a Bruker AVANCE III 400 MHz spectrometer, equipped with a Bruker, 10 mm PABBO probe and a sample temperature of 50° C. The spectra were run with ZGIG pulse sequence, 8000 to 10,000 scans, and a 16 s relaxation delay. The PDMS main-chain Si units were referenced at −22 ppm. Si attached to terminal vinyls were observed at −4 ppm, while Si with pendent vinyls were observed at −36 ppm.

Foam Density

Each Bun foam sample was weighted to the nearest 0.1 gram, and volume of the foam was determined by measuring length, width, and thickness to the nearest 0.01 cm. The density was calculated based on the weight and volume. See FIG. 1 for the sample cut from the Bun foam.

Falling Ball Rebound (Resilience)

A ⅝" diameter steel ball was dropped from a height of 500 mm onto the Bun foam slab, which was cut from the Bun foam, in the vertical direction, such that the slab had both an upper skin and a lower skin. The % Rebound was calculated as the {["rebound height (mm)"/500 (mm)]*100}.

Asker C Hardness

The hardness was an average of five readings (5 seconds latency) measured across the surface of the sample according to ASTM D2240.

Mechanical Properties

Bun foam skin and foam layers were submitted for ASTM D638 (Tensile, Type 4) and ASTM D624 (Tear, Type C) mechanical property testing, each crosshead speed at 20 inches/minute. The sample thickness was approximately 3 mm. The split tear strength was measured by using a specimen with the dimension of 6 inch (length)*1 inch (width)*0.4 inch (thickness), and a notch depth from 1 to 1.5 inch, and at the testing speed of 2 inches/minute.

DIN Abrasion Test (Rotary Drum Method):

The DIN abrasion volume loss (in mm$^3$) was measured according to ASTM D5963, with a load of 10 N, and using a rotation mode (method B, 40 rpm for drum) during this test, 40 m abrasion. For each foam formulation, a rectangular slab (skin on 5 one surface, approx. 10 mm in thickness) was cut from a Bun foam, and this slab was die cut into discs, each with the following dimensions: diameter was 16 mm with a thickness of approx. 10 mm. The DIN abrasion volume loss was calculated according to the equation below:

$$DIN = \frac{\Delta m_t * 200 \text{ mg}}{\rho_t * \Delta m_s}$$

where:

DIN: abrasion loss in mm$^3$, $\Delta m_t$: weight loss of the tested specimen in mg $\rho_t$: density of the tested specimen in mg/mm$^3$, $\Delta m_s$: weight loss of the standard rubber in mg.

An average value was reported based, on three test samples.

Wet COF

The wet COF was measured according to ASTM D1894 (see FIG. 1a), with a load of 2.7 kg and a pulling speed of 100 mm/min, for a pull distance of 230 mm. In this test, the ground glass (plane) was used as the substrate, and deionized water was uniformly spread on the glass surface to form a thin water film. For each foam formulation, a rectangular slab (skin on one surface, approx. 7 mm in thickness) was cut from a Bun foam, and this slab was die cut into discs, each with the following dimensions: diameter approx. 12.7 mm, thickness approx. 7 mm). The disc was fastened to the sled with double sided tape, with the skin surface exposed, and in contact with glass plane. The maximum force Fm (kgf) during the pull distance was recorded, and the wet COF was calculated as (Fm)/(2.7 kgf), and the average wet COF of three test samples was recorded.

Density—Polymer Samples

Polymer samples were prepared according to ASTM D 1928. Measurements were made within one hour of sample pressing using ASTM D792, Method B.

Melt Index

Melt index (or I2,I2 or MI) for an ethylene-based polymer, or an OBC, or an inventive composition, was measured in accordance with ASTM D 1238, Condition 190° C./2.16 kg, and is reported in grams eluted per 10 minutes.

DSC Standard Method

Differential Scanning Calorimetry (DSC) is used to measure crystallinity in ethylene-based polymers (PE, or OBC) samples and propylene-based polymer (PP) samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for ethylene-based polymer samples (230° C. for propylene-based polymer samples). The sample is kept at this temperature for three minutes. Then the sample is cooled at a rate of 10° C./min to −60° C. for ethylene-based polymer samples (−40° C. for propylene-based polymer samples), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for ethylene-based polymer samples (165 J/g, for propylene-based polymer samples), and multiplying this quantity by 100 (e.g., for ethylene-based polymer samples, % cryst.=($H_f$/292 J/g)×100; and for propylene-based polymer samples, % cryst.=($H_f$/165 J/g)×100).

Unless otherwise stated, melting point(s) ($T_m$) of each polymer is determined from the second heat curve obtained from DSC, as described above (peak $T_m$). The crystallization temperature ($T_c$) is determined from the first cooling curve (peak $T_c$).

Compression Set

Compression set was measured according to ASTM D395 at 50° C. For each foam formulation, a rectangular slab (skin on one surface, approx. 19.5 mm in thickness) was cut from a Bun foam, and this slab was die cut into discs (button samples), each with the following dimensions: 29 mm (±0.5 mm) in diameter, and approx. 19.5 mm (±0.5 mm) thickness. Each button sample was inspected for notches, uneven thickness and inhomogeneity, and selected buttons (without those defects) were tested. Compression set was performed on two specimens for each sample, at the temperatures specified, and the average results of the two specimens was reported. The button sample was placed in the compression device having two metal plates that could be pressed together, and locked into place at 50% of the original height of the button sample. The compression device, with the compressed samples, was then placed in an oven, and equilibrated at the appropriate temperature for a specified time (6 hrs at 50° C.). In this test, the stress was released at the test temperature, and the thickness of the sample was measured after a 30 minute equilibration period at room temperature. Compression set is a measured of the degree of recovery of a sample following compression, and is calculated according to the equation CS=(H0−H2)/(H0−H1); where H0 is the original thickness of the sample, H1 is the thickness of the spacer bar used, and H2 is the final thickness of the sample after removal of the compressive force.

Expansion Ratio

The expansion ratio was calculated on the Bun Foam, via the equation below:

$$ER = L_1/L_0$$

Where the $L_0$ is the length of the mold and $L_1$ is the length of the Bun foam after stabilization at room temperature (overnight).

Experimental

Materials are listed in Table 1.

TABLE 1

| Component | Supplier | Properties | Shape |
|---|---|---|---|
| INFUSE 9100* | Dow | MI 1 (190 C., 2.16 Kg) | Pellets |
| MB50-002 silicone rubber blend (contains silicone rubber) | Dow Corning | | Pellets |
| RBB 2008-50 silicone rubber base | Dow Corning | 50 shore A hardness | Block |
| PICCOTAC R1100 | Eastman | C5 resin, Mw: 2900 | Powder |
| REGALITE R1125 | Eastman | Hydrogenated C9 resin, Mw: 1200 | Powder |
| ESCOREZ 5400 | ExxonMobil | Hydrogenated DCPD resin, Mw: 670 | Powder |
| LUPEROX DC40P** | Arkema | 40% active peroxide | Powder |
| LUPEROX DC40P-SP2*** | Arkema | 40% active peroxide | Powder |
| AC9000, Azodicabonamide (blowing agent) | | 100% active | Powder |
| ZnO | | 100% active | Powder |
| ZnSt | | 100% active | Powder |
| CaCO3 | Atomite | 100% active | Powder |

*Ethylene/octene multi-block copolymer.
**Dicumyl peroxide (DCP) with active peroxide content of around 40 wt %.
***Scorch protected DCP with active peroxide content of around 40 wt %.

Formulation Preparation and Sample Preparation

Formulations (compositions) are shown in Table 2. The noted silicone rubbers were used as anti-abrasion agents. The dosage of crosslinking agent was fixed and blowing agent dosage was adjusted accordingly to obtain similar expansion ratio.

TABLE 2

Comparative and Inventive Compositions

| | Comp. Ex. 1 | Comp. Ex. 2 | Comp. Ex. 3 | Comp. Ex. 4 | Inv. Ex. 1 | Inv. Ex. 2 | Inv. Ex. 3 | Inv. Ex. 4 |
|---|---|---|---|---|---|---|---|---|
| INFUSE 9100 | 100 | 100 | 85 | 100 | 100 | 100 | 100 | 85 |
| RBB 2008-50 | | | 15 | | | | | 15 |
| MB50-002 | | 3 | | | 3 | 3 | 3 | |
| PICCOTAC R1100 | | | | 2 | 2 | | | 2 |
| REGALITE R1125 | | | | | | 2 | | |
| ESCOREZ 5400 | | | | | | | 2 | |
| DC40P | 1.2 | 1.2 | 1.2 | 1.2 | 1.2 | 1.2 | 1.2 | 1.2 |
| DC40P-SP2 | 0.8 | 0.8 | 0.8 | 0.8 | 0.8 | 0.8 | 0.8 | 0.8 |
| AC9000 | 2.2 | 2.1 | 2.5 | 1.6 | 1.5 | 1.6 | 1.7 | 1.9 |
| ZnO | 0.22 | 0.21 | 0.25 | 0.16 | 0.15 | 0.16 | 0.17 | 0.19 |
| ZnSt | 0.22 | 0.21 | 0.25 | 0.16 | 0.15 | 0.16 | 0.17 | 0.19 |
| CaCO3 | 5 | 5 | 5 | 5 | 5 | 5 | 5 | 5 |

Each formulation, listed in the Table 2, was prepared by using the same method. Taking CE-1 formulation, as an example, the polymer(s) (here, only INFUSE 9100 (914 grams)) was/were added to a "1.5 liter" BANBURY mixer. Then, ZnO, ZnSt and CaCO3 were added, after the polymer component(s) had melted (around 5 minutes at 120° C.). The blowing agent and peroxide were added last, and mixed for another 3 to 5 minutes at around 120° C. (temperature does not exceed over 130° C.) for a total mixing time of 15 minutes, to form a mixed formulation.

The mixed formulation was added to a two-roll mill, to form a roll milled blanket (approx. 5 mm thickness). The blanket was cut into squares. Several squares, weighing 420 grams in total, were placed inside a pre-heated Bun foam mold (7 in×7 in×0.5 inch). The preheating was conducted for 9 minutes at 120° C. (no pressure), and for 4 minutes at 120° C. and an applied force of 10 tons. The preheated sample was transferred to a foaming press, and held for 10 minutes at 180° C. and at an applied force of 4 tons (pressure of 100 kg/cm$^2$). Once the pressure was released, the Bun foam released quickly from the tray, and was placed in a vent hood on several non-stick sheets. The Bun foam was allowed to cool overnight, and then cut into slices for testing.

The Bun foams were trimmed into "6 inch×6 inch" plaques, using a vertical band saw. Density, Hardness and Resilience of the form trimmed slabs (with skin on two surfaces) were measured. Thin slices were then cut from the trimmed slabs into required thickness (around 3 mm in thickness) using a lab scale horizontal band saw. The slices (some contain a skin layer, and some do not contain a skin layer) were used to measure the tensile strength and tear properties. Generally, the remaining middle foam layer of the trimmed Bun foam was used to measure shrinkage resistance of the foam. Other parts of the Bun foam were cut into slices with different thickness for specific tests; e.g., 7 mm thickness for the wet COF test, 10 mm thickness for DIN abrasion test, 10 mm thickness for split tear test, and 19.5 mm thickness for compression set test.

Results and Discussion

Table 3 lists the unitsole foam properties of the inventive examples and the comparative examples, including expansion ratio, foam density with skin, hardness, mechanical properties, DIN abrasion and wet COF. As seen from Comparative Example 1, 2 and 3, for compositions having the same/similar foam hardness, the abrasion resistance can be greatly increased by adding anti-abrasion agent (the silicone rubber MB50-002 and RBB 2008-50), however the traction performance (wet COF) decreased.

As seen from Comparative Example 1 and 4, for compositions, for compositions having the same/similar foam hardness, the traction performance and abrasion resistance were improved by adding tackifier, but the abrasion resistance was still far from the unitsole target (DIN ≤200 mm³). As seen from Comparative Example 2 and Inventive Examples 1, 2 and 3, for compositions having the same/similar foam hardness and similar foam density, the inventive compositions (OBC/MB50-002/tackifier) provide better traction performance than comparative composition (OBC/MB50-002), while maintaining similar or better abrasion resistance. In addition, the inventive compositions (OBC/MB50-002/tackifier) provide excellent mechanical properties, especially split tear. As seen from Comparative Example 3 and Inventive Examples 4, for compositions having the same/similar foam hardness and similar foam density, the inventive composition (OBC/RBB 2008-50/tackifier) provides better traction performance and better split tear than comparative composition (OBC/RBB 2008-50), while maintaining similar abrasion resistance.

Thus, it has been discovered that for compositions having similar foam hardness and foam density, the addition of a tackifier (for example, a C5, C9 or DCPD based hydrocarbon resin) can provide better traction performance and better mechanical properties, while maintaining good abrasion resistance. Thus, the inventive compositions have a synergy effect for unitsole application, and provide foamable unitsole formulations having excellent properties, such as, for example, a % Rebound ≥60, a DIN ≤210 mm³ and a wet COF ≥0.59.

TABLE 3

Properties of Comparative and Inventive Compositions (with skin)

| Unit | Comp. Ex. 1 | Comp. Ex. 2 | Comp. Ex. 3 | Comp. Ex. 4 | Inv. Ex. 1 | Inv. Ex. 2 | Inv. Ex. 3 | Inv. Ex. 4 |
|---|---|---|---|---|---|---|---|---|
| Expansion ratio* | 1.51 | 1.49 | 1.46 | 1.48 | 1.46 | 1.46 | 1.45 | 1.47 |
| Density* (g/cm³) | 0.23 | 0.24 | 0.25 | 0.24 | 0.25 | 0.26 | 0.25 | 0.25 |
| Hardness* (Asker C) | 53 | 53 | 53 | 53 | 53 | 53 | 53 | 50 |
| Resilience* (%) | 68 | 67 | 70 | 66 | 66 | 65 | 66 | 67 |
| Tensile** (MPa) | 2.5 | 2.5 | 3.1 | 3.1 | 3.2 | 2.8 | 2.7 | 2.8 |
| Elongation** (%) | 329 | 350 | 342 | 463 | 490 | 432 | 425 | 406 |
| Tear** (N/mm) | 12.6 | 13.1 | 14.7 | 14.9 | 14.6 | 14.4 | 14.4 | 14.1 |
| Split tear** (N/mm) | 3.4 | 3.5 | 2.9 | 4.2 | 4.2 | 4.5 | 4.1 | 3.6 |
| Abrasion**, DIN (mm3) | 658 | 218 | 148 | 552 | 204 | 167 | 198 | 156 |
| Wet COF** | 0.61 | 0.55 | 0.56 | 0.64 | 0.59 | 0.59 | 0.60 | 0.60 |

*Two skin surfaces (entire slab).
**One skin surface or the skin sample.

What is claimed is:

1. A composition comprising at least the following:

A) an olefin multi-block copolymer;

B) a silicone rubber;

C) a tackifier; and wherein the silicone rubber has a weight average molecular weight (Mw)≥200,000 g/mole; and wherein the weight ratio of component A to component B is from 4.0 to 40; the weight ratio of component A to component C is from 30 to 60; and the weight ratio of component B to component C is from 1.0 to 10; wherein the composition has an abrasion DIN value ≤210 mm³, and a wet COF value ≥0.52.

2. The composition of claim 1, wherein the olefin multi-block copolymer of component A is present in an amount ≥50 wt %, based on the weight of the composition.

3. The composition of claim 1, wherein the silicone rubber has a weight average molecular weight (Mw) ≥400,000 g/mole.

4. The composition of claim 3, wherein the composition has an abrasion DIN value ≤210 mm³, and a wet COF value ≥0.52.

5. The composition of claim 4, wherein the composition has a Resilience of ≥65%.

6. An article comprising at least one component formed from the composition of claim 4.

7. The composition of claim 1, wherein the olefin multi-block copolymer is an ethylene/α-olefin multi-block copolymer.

8. The composition of claim 1, wherein the tackifier is a hydrocarbon.

9. The composition of claim 1, wherein the silicone rubber comprises a structure selected from i) and/or a structure selected from ii) below:

i) —O—[Si(R)(CH=CH$_2$)]—[Si(R")(R")]—O—, wherein R, R' and R" are each, independently, an alkyl group, and wherein R, R' and R" may all be the same alkyl group;

ii) H$_2$C=CH—[Si(R$^{IV}$)(R$^V$)]—O—, wherein R$^{IV}$ and R$^V$ are each, independently, an alkyl group, and wherein R$^{IV}$ and R$^V$ may be the same alkyl group.

10. The composition of claim 1, wherein the olefin multi-block copolymer has a density from 0.866 g/cc to 0.887 g/cc.

11. The composition of claim 1, wherein the olefin multi-block copolymer has a melt index (I2) from 0.5 to 5.0 g/10 min (190° C. and 2.16 kg).

12. An article comprising at least one component formed from the composition of claim 1.

13. The article of claim 12, wherein the article is a foam.

14. The composition of claim 1, wherein the composition comprises ≥60 wt % of components A, B and C, based on the weight of the composition.

15. The composition of claim 14, wherein the composition has an abrasion DIN value ≤210 mm³, and a wet COF value ≥0.52.

16. The composition of claim 15, wherein the composition has a Resilience of ≥65%.

17. An article comprising at least one component formed from the composition of claim 15.

18. The composition of claim 1, wherein the composition has a Resilience of ≥65%.

19. An article comprising at least one component formed from the composition of claim 1.

* * * * *